United States Patent
Xiao et al.

(10) Patent No.: US 10,392,565 B2
(45) Date of Patent: Aug. 27, 2019

(54) CONVERSION OF BIOMASS BY EFFICIENT BASE-CATALYZED DECARBOXYLATION REACTION

(71) Applicant: Savannah River Nuclear Solutions, LLC, Aiken, SC (US)

(72) Inventors: Xin Xiao, Augusta, GA (US); Anthony B. Thompson, Aiken, SC (US); Martin P. Sulic, Aiken, SC (US); Patrick A. Ward, Aiken, SC (US); Donald L. Anton, Aiken, SC (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 0 days.

(21) Appl. No.: 15/841,927

(22) Filed: Dec. 14, 2017

(65) Prior Publication Data
US 2019/0185757 A1  Jun. 20, 2019

(51) Int. Cl.
*C10G 1/00* (2006.01)
*C10G 1/02* (2006.01)
*C01B 32/50* (2017.01)

(52) U.S. Cl.
CPC .............. *C10G 1/02* (2013.01); *C01B 32/50* (2017.08); *C10G 2300/1014* (2013.01); *C10G 2300/202* (2013.01); *C10G 2300/44* (2013.01)

(58) Field of Classification Search
None
See application file for complete search history.

(56) References Cited

U.S. PATENT DOCUMENTS 2,551,579 A * 5/1951 Berl .................. C10G 1/02
106/165.01
4,321,360 A   3/1982 Blount
(Continued)

FOREIGN PATENT DOCUMENTS

WO    WO 2011/126382    10/2011
WO    WO 2016/201414    12/2016
WO    WO 2017/089312    6/2017

OTHER PUBLICATIONS

G. Kabir, B.H. Hameed. Recent progress on catalytic pyrolysis of lignocellulosic biomass to high-grade bio-oil and bio-chemicals. Renewable and Sustainable Energy Reviews (2016) http://dx.doi.org/10.1016/j.rser.2016.12.001.
(Continued)

*Primary Examiner* — Philip Y Louie
(74) *Attorney, Agent, or Firm* — Dority & Manning, PA

(57) ABSTRACT

Highly efficient and universal biomass conversion methods are described. Methods utilize a base-catalyzed decarboxylation reaction in a conversion process carried out in the presence of excess base to overcome carbonate formation from $CO_2$. Methods can efficiently convert all components of a biomass feedstock to liquid hydrocarbons and carbon dioxide byproduct. The process has several versions: hydrolysis and alcoholysis, etc. The chemical process can be carried out with nearly 100% conversion for any type of biomass feedstock and requires no expensive or complicated pretreatment. The conversion reactions can be carried out at moderate temperatures of 170-300° C. and form a product that can include a mixture of hydrocarbons and oxygenated hydrocarbons, including alcohols and phenol derivatives.

18 Claims, 7 Drawing Sheets

(56) References Cited

U.S. PATENT DOCUMENTS

| | | | |
|---|---|---|---|
| 4,935,567 A * | 6/1990 | Yokoyama | C10G 1/04 |
| | | | 127/37 |
| 6,908,995 B2 | 6/2005 | Blount | |
| 8,137,632 B2 | 3/2012 | Bartek et al. | |
| 8,674,152 B1 | 3/2014 | Xiao | |
| 9,388,344 B2 | 7/2016 | Chheda et al. | |
| 9,631,146 B2 | 4/2017 | Beckham et al. | |
| 2010/0051859 A1* | 3/2010 | House | B01D 53/62 |
| | | | 252/182.32 |
| 2012/0037486 A1 | 2/2012 | O'Connor et al. | |
| 2013/0079566 A1 | 3/2013 | Lin | |
| 2013/0192123 A1* | 8/2013 | Maschmeyer | C10G 1/083 |
| | | | 44/307 |
| 2014/0238869 A1* | 8/2014 | DiMascio | C25B 1/10 |
| | | | 205/338 |
| 2014/0273104 A1 | 9/2014 | Paripati et al. | |
| 2015/0247095 A1 | 9/2015 | Ramirez Corredores et al. | |
| 2015/0321980 A1 | 11/2015 | Levin | |

OTHER PUBLICATIONS

Juan Carlos Serrano-Ruiz. Biomass Conversion Technologies: Catalytic Conversion Technologies. In: Rabacal M., Ferreira A., Silva C., Costa M. (eds) Biorefineries. Lecture Notes in Energy, vol. 57. Springer, Cham. Abstract, 2017.

\* cited by examiner

CONVERSION OF BIOMASS BY EFFICIENT BASE-CATALYZED DECARBOXYLATION REACTION

FEDERAL RESEARCH STATEMENT

This invention was made with government support under Contract No. DE-AC09-08SR22470 awarded by the U.S. Department of Energy. The government has certain rights in the invention.

BACKGROUND

Biomass has the potential to be a major source of renewable energy, and many years of research has been carried out in an attempt to tap this renewable energy source in an economical and efficient fashion. Unfortunately, existing biomass conversion processes have proven limited in useful applicability. For instance, transesterification can only use fats and oils as feedstock for production of biodiesel. Fermentation processes commonly utilized for ethanol production are relatively efficient, but compete with food source biomass. Hydrothermal liquefaction of biomass is hindered by crosslinking of reaction intermediates, resulting in low yields and poor product quality. Wet biomass conversion is challenging due to the intensive energy requirements for pretreatment. Gasification or pyrolysis processes have efficiency loss due to high temperature requirements. Moreover, in all commonly utilized biomass conversion processes major components of the biomass feedstock, i.e., cellulose and lignin, are not well utilized and technologies for efficient conversion of these components simply does not exist. A lack of efficient conversion technology is also a significant issue for wet and whole-plant biomass, which are the most common and economically viable forms of biomass.

What are needed in the art are improved methods for conversion of biomass to useful hydrocarbon products by efficient and simple steps using processes with moderate temperature and energy requirements. Methods capable of high conversion (i.e., complete or essentially complete) of any biomass feedstock, and in particular whole-plant biomass feedstock, that can tolerate impurities, e.g., water and dirt from harvest, would be of great benefit.

SUMMARY

According to one embodiment, disclosed is a method for converting a biomass feedstock to a product comprising liquid hydrocarbons. A method can include combining a biomass feedstock, a base, and a solvent to form a reaction mixture. More specifically, the reaction mixture includes an excess quantity of the base. The method also includes heating the reaction mixture to a reaction temperature to encourage a decarboxylation reaction via, e.g. alcoholysis and/or hydrolysis of the biomass feedstock. The base is included in the reaction mixture in an amount such that the reaction mixture is maintained at a pH of about 11 or greater over the course of the reaction. During the reaction, the excess base can function as a catalyst for the decarboxylation reaction and also as a reactant for reaction with carbon dioxide created in the alcoholysis/hydrolysis reaction. As such, the reaction kinetics can favor the conversion reaction, with complete or essentially complete conversion of the biomass feedstock in some embodiments. Moreover, the process can be carried out at relatively low temperatures and can provide extremely high conversion of all components of any type of biomass feedstock, including wet and whole-plant biomass. In addition, the reaction mixture can be maintained under sufficient pressure over the course of decarboxylation reaction such that the reaction mixture is not completely vaporized. For instance, suitable pressure can be self-generated or otherwise provided.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
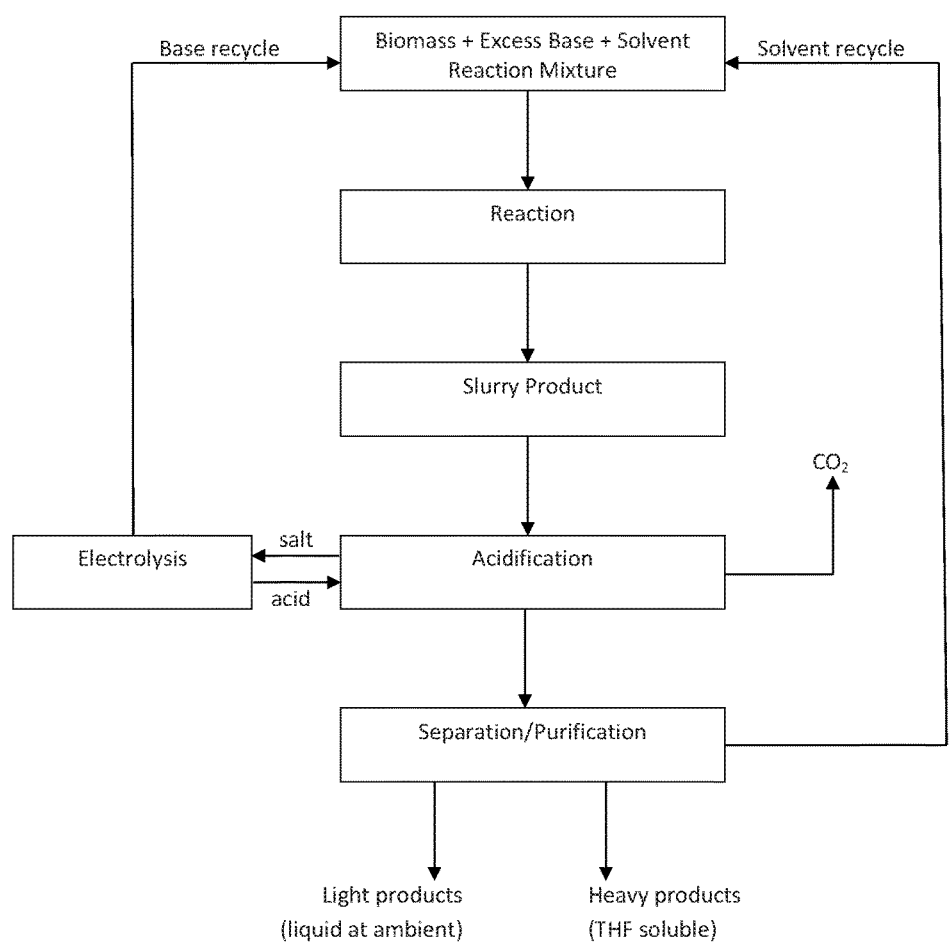
FIG. 1 presents a flow diagram for one embodiment of a conversion process as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

The invention is generally directed to highly efficient and universal biomass conversion methods. More specifically, disclosed methods utilize a base-catalyzed decarboxylation reaction in a conversion process carried out in the presence of excess base. Disclosed methods can efficiently convert essentially all components of a biomass feedstock to liquid hydrocarbons and carbon dioxide, including those components that are not utilized or converted in previously known methodologies (e.g., cellulose and lignin). The disclosed chemical biomass conversion process can be carried out quickly, for instance within 1 hour, with the possibility of reducing it down to minutes in some embodiments. In addition, the methods can be carried out with any type of biomass feedstock and require no expensive or complicated pretreatment. The conversion reactions can be carried out at moderate temperatures, e.g., from about 170° C. to about 300° C., and can result in very high conversion, e.g., close to 100% conversion of almost any type of biomass to form a product that can include a mixture of hydrocarbons and oxygenated hydrocarbons, including alcohols and phenol derivatives.

A flow diagram for one embodiment of a biomass conversion process as disclosed herein is illustrated in FIG. 1. As indicated, a process can include combining a biomass feedstock, a base, and a solvent to form a reaction mixture.

The biomass feedstock can include any combination of plant and animal materials. For instance, the biomass feedstock can include byproducts or waste residue including, without limitation, forest wastes, yard waste, waste material from food processing residue, energy crops, or plant products that are normally considered waste materials. The biomass feedstock can include any combination of fat/oil, starch, cellulose, lignin, hemicellulose, etc. In one particular embodiment, the biomass feedstock can include whole plant biomass (including root and dirt).

The biomass feedstock can include woody and non-woody sources. Woody lignocellulosic biomass can be sourced from forests, agriculture, or any other source and can encompass hardwood and/or softwood source materials. For example, fast-growing tree species such as hybrid willow (Salix) and poplar, as have been developed for production in agricultural settings, can be utilized.

Agriculture systems can be a source of biomass feedstock materials. Agricultural systems can produce several different types of non-woody biomass feedstock materials including higher cellulose content materials such as plant leaves and higher lignin content materials such as stems and stalks. For example, harvesting of cereals, vegetables, and fruits can provide waste materials for use as biomass feedstock. Agricultural residues including field residues and processing residues can provide source materials. Field residues include materials left following harvest and can include, without limitation, straw and stalks, leaves, and seed pods. Processing residues, such as husks, seeds, bagasse and roots can include those materials left after the initial processing of the crop into a desired form. Examples of agricultural residue source materials can include, without limitation, rice straw, wheat straw, corn stover, and sugarcane bagasse.

Other waste streams such as municipal waste, industrial waste, construction waste, sawmill waste, etc., can provide materials for a biomass feedstock. For instance, yard waste, holiday waste, etc. can provide a biomass source material.

Perennial and annual grasses can provide biomass feedstock materials. Examples of grass source materials can include, without limitation, switchgrass (*Panicum virgatum*), miscanthus (*Miscanthus* spp. *Anderss*), canary grass (*Phalaris arundinacea*), giant reed (*Arundo donax* L.), alfalfa (*Medicago sativa* L.), sorghum (*Sorghum bicolor*) and Napier grass (*Pennisetum purpureum*).

Beneficially, disclosed methods do not require any expensive or extensive pre-treatment of the biomass feedstock. However, in general, it may be beneficial to subject the biomass feedstock to a size reduction process, depending upon the nature of the feedstock. The biomass feedstock can be chopped or ground to increase the surface area of the feedstock and as such, in some cases, the biomass feedstock can be pre-processed by size reduction of materials, such as by cutting, grinding, shearing, pulverizing, or chopping. For example, in some cases, loose feedstock (e.g., recycled paper, starchy materials, coal or switchgrass) can be pre-processed by shearing or shredding. In other cases, biomass can be pretreated or processed by a physical size reduction process (e.g., chopping, grinding, etc.). Pre-treatment followed by size reduction can be advantageous since treated materials tend to be more brittle and, therefore, easier to size reduce. Screens and/or magnets can be used to remove oversized or undesirable objects such as, for example, rocks or nails from the feed stream.

The process beneficially lends itself to the ability to mix together different types of biomaterials in a single treatment process. For instance, mixtures of coal with wood scraps may be converted in the same reaction vessel. Similarly, seasonal variations and fluctuations of biomaterials are fully compatible with integration of various source materials in varied combinations and ratios without interruption. Thus, a method can allow for the feedstock to be varied with any combination of, for example and without limitation to: coal, peat, brown coal, lignin, cellulose, whole plant biomass, or mixtures thereof.

The reaction mixture includes a solvent in combination with the biomass feedstock. The solvent can include water, one or more organic solvents, or combinations thereof. Organic solvents can include $C_1$ to $C_8$ organic solvents such as, and without limitation to, organic hydrocarbons, alcohols (e.g., aliphatic or aromatic alcohols), ethers, ketones, recycled biomass product (bio-oil) and mixtures thereof. Organic alcohols as may be utilized can encompass, for example, methanol, ethanol, 1-propanol, 2-propanol (isopropyl alcohol), etc., or mixtures thereof.

In some embodiments, the solvent and the biomass feedstock can be combined such that the ratio of the weight of the biomass feedstock to the volume of the solvent as fed to the process is from about 1:5 kg/L to about 1:10 kg/L. For instance the reaction composition can include 1 kilogram (kg) of biomass feedstock and about 5 liters (L) of the solvent, about 1 kg biomass feedstock and about 6 L of the solvent, or about 1 kg biomass feedstock and about 10 L of the solvent, in some embodiments.

Given the complexity and diversity of biomass feedstocks, in some embodiments the carbon content of a biomass feedstock can be tracked to develop an optimum ratio of the reaction mixture. In one embodiment, any remaining weight percentage of the biomass content other than carbon can be viewed as if it were water or solvent. For example, 1.0 kg biomass feed with 50 wt % carbon content can be viewed as 0.5 kg feed carbon and 0.5 kg moisture (including hydration chemicals, not free standing water). Thus, a reaction mixture of 14 kg biomass, 10 kg KOH and 90 liter methanol may be used in a 300 liter reaction vessel. In another example, a reaction mixture of 14 kg biomass, 6.6 kg Ca(OH)$_2$ and 40 liter water may be used in a 300 liter reaction vessel. Alternatively, 1.0 kg coal feed with 70 wt % carbon content can be viewed as 0.7 kg feed carbon and 0.3 kg moisture. A reaction mixture of 10 kg coal; 10 kg KOH and 100 liter methanol may be used in a 300 liter reaction vessel. In these examples, the solvent and base quantities can be adjusted according to the biomass (or coal) feed composition on molar basis.

Table 1 shows the equivalent molar amount of carbon, base and solvent in the reaction mixture used in these 3 exemplary embodiments.

TABLE 1

| Feed | Base | Solvent | C, kmole | Base, kmole | MeOH + H$_2$O, kmole |
|---|---|---|---|---|---|
| 14 kg biomass | 10 kg KOH | 90 liter MeOH | 0.58 | 0.18 | 2.6 |
| 14 kg biomass | 6.6 kg Ca(OH)$_2$ | 40 liter H$_2$O | 0.58 | 0.18 | 2.6 |

TABLE 1-continued

| Feed | Base | Solvent | C, kmole | Base, kmole | MeOH + H$_2$O, kmole |
|---|---|---|---|---|---|
| 10 kg coal | 10 kg KOH | 100 liter MeOH | 0.58 | 0.18 | 2.6 |

The base component of the reaction mixture can include any base or alkali capable of functioning as a catalyst in the decarboxylation reaction and further capable of reacting with the carbon dioxide decarboxylation reaction product. By way of example, the base can include oxides or hydroxides of groups IA or IIA metals in the periodic table, or hydrides of groups IA, IIA, or IIIA metals, or metal-organic compounds containing groups IA, IIA, or IIIA metals such as sodium methoxide or aluminum isopropoxide.

The reaction mixture includes the base component in a stoichiometric amount such that upon complete consumption of the base component by carbon dioxide byproduct that is formed in the biomass conversion, an excess amount of base is retained in the mixture. In general, the reaction mixture can include the base component such that the molar ratio of the carbon in the biomass feedstock to the base monovalent equivalent is from about 5:1 to about 1:2, for instance about 10:3 in some embodiments, e.g., about 10 moles carbon from the biomass feedstock to about 3 moles monovalent base or equivalent. For example, using a biomass feedstock having about 50 wt. % carbon content with a KOH base, the reaction mixture can include about 240 g biomass (10 mole×12 g C/mole/50 wt. %) and about 168 g KOH (3 moles×56 g/mole), or about 240 g biomass and about 87.5 g Mg(OH)$_2$ (3 moles×58.3 g/mole/2). During the reaction process, part of the base component can react with the CO$_2$ byproduct formed in the decarboxylation reaction of the biomass feedstock to form carbonate. This can provide a thermodynamic driving force to the overall reaction. With an excess amount of the base component, the reaction mixture can have an initial pH of about 14 or greater and the pH of the reaction mixture can remain at about 11 or greater throughout the conversion process.

The overall reaction mixture ratio can have an optimum range for the conversion of biomass in decarboxylation reaction that can be determined through experimental procedures as would be evident to one of ordinary skill in the art. For example, the molar ratio of carbon in the biomass feedstock, normality of the base, and solvent plus noncarbon portion of the feedstock can be from about 1:about 0.2 to about 2:about 1 to about 10. The noncarbon portion of the feedstock can be treated as water for simplicity in the calculation, including water, moisture, hydroscopic water, chemically bonded oxygen and hydrogen, etc. This approach can have practical importance for e.g., algae and wet biomass feedstocks.

As the decarboxylation reaction proceeds, the CO$_2$ byproduct can react and consume the base (e.g., KOH) and convert it into carbonate, e.g., K$_2$CO$_3$. As such, the pH of the reaction mixture could potentially decrease (e.g., to less than 11). However, through inclusion of excess base as described herein, following complete reaction of the CO$_2$, an amount of the base can still remain in the reaction mixture, maintaining the mixture at a high pH, e.g., greater than about 11, greater than about 12, greater than about 13, or greater than about 14 in some embodiments. This is a key difference between the disclosed process and other bioconversion processes, e.g., hydrothermal liquefaction.

Referring again to FIG. 1, upon formation of the reaction mixture and addition of suitable energy, usually in the form of increased temperature of the reaction mixture, the conversion reaction of the biomass feedstock can be carried out. Beneficially, the conversion reaction can be carried out at a relatively low reaction temperature, e.g., about 300° C. or lower, or about 250° C. or lower in some embodiments. For example, the conversion reaction can be carried out at a temperature of about 170° C. to about 290° C., or about 170° C. to about 230° C. in some embodiments.

The conversion reaction is primarily a decarboxylation reaction, with decarbonylation possibly included as a secondary reaction. The chemical conversion from biomass, simplified below in reaction (1) as carbon and water, to fuel can be illustrated as:

$$3C+2H_2O \rightarrow 2\text{-}CH\text{-}(oil)+CO_2 \qquad (1)$$

The refined chemistry in a process utilizing a potassium hydroxide base and water as solvent can be illustrated as:

$$1.17\text{-}CH_{0.8}\text{-}+0.33H_2O \rightarrow \text{-}CH_{1.6}\text{-}(oil)+0.17CO_2 \qquad (2)$$

$$0.33KOH+0.17CO_2 \rightarrow 0.17K_2CO_3+0.17H_2O \qquad (3)$$

When water is employed as solvent, the decarboxylation reaction proceeds via hydrolysis of the biomass. When utilizing an alcohol solvent, the reaction proceeds via alcoholysis rather than hydrolysis. For example, a base-catalyzed conversion process using methanol solvent and KOH catalyst can be termed a methanolysis process.

The above reaction (2) itself is thermodynamically unfavorable (endothermic 15.68 kJ/mole product C), but by removing CO$_2$ using a caustic solution as indicated in reaction (3) (exothermic −17.96 kJ/mole product C), the equilibrium is driven to the product side. The moderate exothermic enthalpy change of CO$_2$ removal is almost equal to but slightly greater than the endothermic enthalpy change of the biomass hydrolysis reaction, which illustrates the efficiency of the reaction pathway of the disclosed process.

Depending upon the specific make-up of the biomass feedstock, the decarboxylation reaction can proceed at various rates overall as well as at different rates for different components of the reaction mixture. In any case, once the reaction is achieved for the least reactive feed components, conversion of the more reactive feed components can be understood to be complete or essentially complete. The decarboxylation reaction can be carried out such that the reaction product includes liquids. For instance, the reaction mixture can be maintained under sufficient pressure (which can be self-generated due to the formation of the CO$_2$) such that the reaction mixture (including the products) is not completely vaporized, and at least a portion of the product mixture is in the liquid phase. For instance, in one embodiment the reaction process can be carried out under a pressure of from about 200 psig to about 6000 psig.

Ranking of feedstock reactivity for typical feedstock components is as follows: vegetable oil/animal fat>starch/sugar>cellulose>lignin. Depending upon the particular feedstock make-up, the overall reactivity of the biomass feedstock and the overall rate of reaction and thus reaction time can be compensated with reaction temperature adjustments as is well within the capabilities of one of ordinary skill in the art. In general, a reaction process can provide complete or essentially complete conversion in a matter of hours, e.g., about 1 hour or less. As utilized herein, the term "complete conversion" generally refers to a state in which any unconverted solid residue (i.e., residue that is not THF soluble) remaining following the reaction matches the ash content of the biomass feedstock.

Referring again to FIG. 1, the reaction product can include a lighter component including lighter alkanes that are liquid at ambient temperature, as well as a heavier component, which can include hydrocarbons and/or oxygenated hydrocarbons that are THF soluble but remain as solid at room temperature. As discussed further below, the heavy products obtained from a plant-based biomass feedstock can exhibit an FTIR spectrum almost identical to the heavy products obtained from a coal feedstock, showing similarity between biomass and coal.

Following the reaction, the product slurry product can be further treated to recover $CO_2$ and separate products, which can also provide both solvent and base recycle stream. For instance, the $CO_2$ can be recovered by acidification of the reaction effluent as a nearly pure byproduct. One embodiment of an acidification process can utilize hydrochloric acid. When considering use of a potassium hydroxide base in the conversion reactions, the acidification reaction can be exemplified as follows:

$$K_2CO_3 + 2HCl \rightarrow 2KCl + H_2O + CO_2 \quad (4)$$

Of course, the reaction process and subsequent acidification are not limited to potassium hydroxide base or hydrochloric acid, and other acids and bases as are known in the art could alternatively be utilized.

As shown, the base and acid can be regenerated and recycled, for instance via electrolysis of the salt formed in the acidification step.

Beneficially, the carbon dioxide recovered byproduct can be very pure, for instance a product $CO_2$ can be about 95% or greater pure $CO_2$. The high purity $CO_2$ capability of the process can facilitate the $CO_2$ capture without additional cost.

The process can also include separation/purification steps as are generally known in the art during which product hydrocarbons can be separated from solvent and one another to the extent desired according to processes as are generally known in the art. For example, the liquid product may be recovered by distillation, decantation, precipitation or any other suitable separation mechanism.

Figure 2:
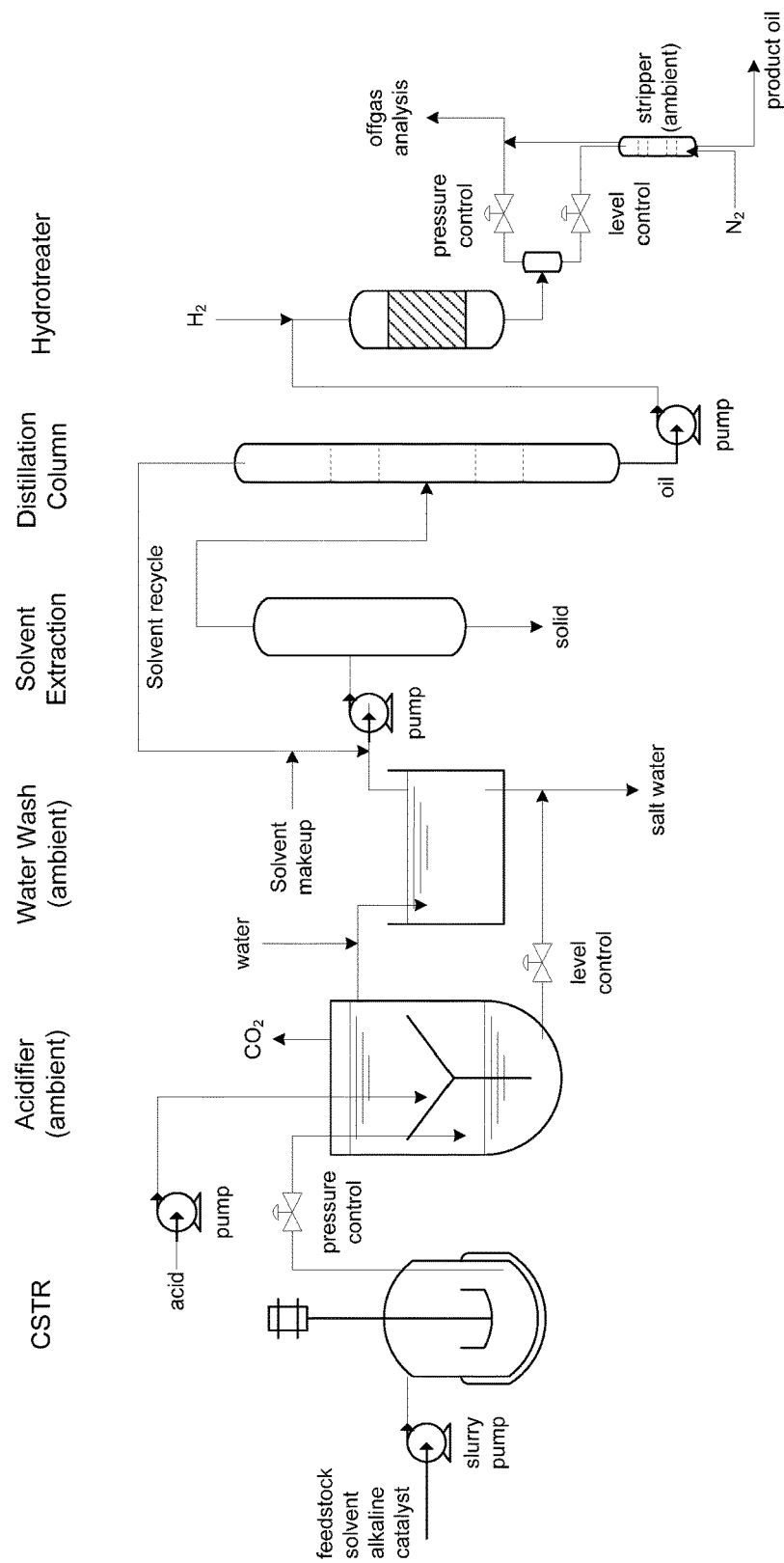
FIG. 2 presents one embodiment of a system for use in a conversion process as described herein.

FIG. 2 schematically illustrates one embodiment of a system that can incorporate a reactor, e.g., a continuous stirred tank reactor (CSTR) as shown, for a biomass conversion process together with additional components for providing a liquid hydrocarbon product. The process can generate, for example, a pumpable liquid fuel hydrocarbon or syncrude that is compatible with processing by petroleum refineries.

As shown, the system can include a reactor into which a slurry including the biomass feedstock, a solvent, and a base can be combined. The conversion reaction can take place within the reactor in a simple one-step reaction process, having the advantages of mild conditions, high yield and no recycle of unconverted feeds. A system can include either a batch treatment process or can be adapted for a continuous treatment process.

Following the conversion reaction in the reactor, the product slurry can pass to an acidifier, where acid can be combined with the reaction products to recover the $CO_2$ reaction product, forming a salt solution. The salt can be removed from the product stream, e.g., at a water wash as shown, and further processed as described previously to recover acid and base for recycle. Any solids can be removed and solvent can be recovered, e.g., via distillation, which can also be utilized to separate heavy and light hydrocarbons formed in the conversion reaction. Optionally, a system can also include a hydrotreater to further up-grade hydrocarbon products of the conversion reaction.

Disclosed methods and systems can provide a universal method for efficient use of hard-to-convert biomass, i.e., lignin and cellulose, as well as the more typical and easy-to-convert biomass feedstock (starch, sugar, vegetable oil, animal fat) either alone or in any combination to form liquid hydrocarbons and, in one embodiment, in formation of transportation fuels. For example, through use of the process starch, sugar and cellulose can be initially converted into glucose and then can be converted to ethanol or other short chain alcohols. Lignin of the biomass feedstock can be converted into phenol derivatives, which can be components of oxygenated fuel. Oil and fat of a feedstock can be converted into biodiesel and glycerol.

Disclosed methods and systems can lead to the next generation biomass conversion technology leapfrogging the previous generations including Gen 1 technology directed to cellulosic ethanol production and biodiesel, now in the demonstration phase with government subsidy; Gen 2 technology directed to ethanol from cellulosic biomass, which is in pre-demo stages; and Gen 3 technology, which includes algae biomass energy production, which is still far from demo stage.

The present disclosure may be better understood with reference to the Examples set forth below.

EXAMPLE 15.0 g biomass, 10.0 g KOH and 90 mL methanol solvent (a 3:2:18 g:g:mL ratio) were used in each test. Biomass sources included poplar chips, loblolly pine, wheat straw, and corn stover. The self-generated autoclave pressure reached 270-2400 psig starting at ambient pressure, depending on reaction temperature and reactor volume/reactant ratio. After the reaction, the reaction mixture included both oil and aqueous phases.

Table 2 shows results from the 4 representative biomass feedstocks in which conversion was measured at essentially 100% at 290° C. and 230° C. reaction temperatures. Significant conversion was also obtained at a lower temperature of 170° C.

TABLE 2

|  | 290° C. | | | 230° C. | | | 170° C. | | |
| --- | --- | --- | --- | --- | --- | --- | --- | --- | --- |
|  | Conv % | Lgt % | Hvy % | Conv % | Lgt % | Hvy % | Conv % | Lgt % | Hvy % |
| Poplar chips | 99.3 | 73.2 | 26.8 | 100.7 | 84.5 | 15.5 | 50.0 | 71.0 | 29.0 |
| Loblolly pine | 98.1 | 63.9 | 36.1 | 100.0 | 73.0 | 27.0 | 55.8 | 53.3 | 46.7 |
| Wheat straw | 102.9 | 77.6 | 22.4 | 102.7 | 86.6 | 13.4 | 67.0 | 83.6 | 16.4 |
| Corn stover | 100.8 | 75.8 | 24.2 | 102.0 | 89.8 | 10.2 | 61.9 | 90.4 | 9.6 |

* Conversion and selectivity data are wt % on MAF (moisture and ash free) basis.

Following the conversion reaction, each biomass product was Soxhlet extracted with THF (tetrahydrofuran) to determine its conversion based on THF-insoluble solid residue as unconverted biomass. Frequently it was found that this solid residue had the same mass as the biomass ash, indicating complete conversion. Because the feedstock ash was excluded in the conversion calculation, conversions slightly above 100% were possible for two reasons: experimental accuracy in determining ash content vs solid residue; and ash being partially converted (e.g., alumina, zinc oxide, etc., dissolved in the caustic process). In the latter case the mass of the solid residue became slightly less than biomass ash.

The product selectively splits into two categories: gas/liquid at ambient as light (Lgt) product, and solid at ambient as heavy (Hvy) product. The light product (Lgt) was a mixture of liquid hydrocarbons, oxygenated hydrocarbons, organic vapor, and $CO_2$ gas. The heavy product was THF soluble but became solid after THF was evaporated. It could be a pumpable fluid under moderate heating. The heavy product yield resulted in roughly 30 wt. % at 290° C. and 15 wt % at 230° C. reaction temperature.

The heavy product (Hvy %) was quantified by product mass, which was THF soluble but solid hydrocarbon (HC) at room temperature. In one embodiment about 6 wt % solid residue was found after THF extraction, and the feedstock had 6 wt % ash content. This led to 100% conversion (MAF basis) in this one-step reaction. The Lgt % fraction was obtained by 1—Hvy %, which consisted of $CO_2$ gas, hydrocarbon vapor and liquid hydrocarbons. The oxygenated hydrocarbons also split into oil and aqueous phases.

Figure 3:
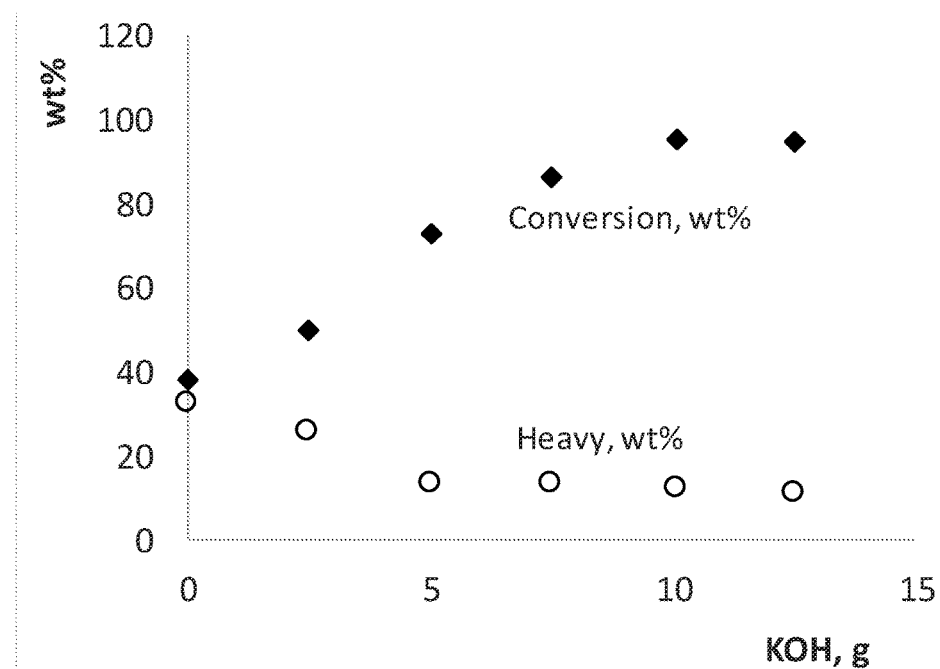
FIG. 3 graphically illustrates variation in biomass conversion with the amount of base included in the reaction mixture for a process as described herein.

FIG. 3 and Table 3 illustrate the variation in conversion and product selectivity for a corn stover biomass feed processed at a reaction temperature of 200° C. and various amounts of base.

TABLE 3

| KOH, g | Conv % | Lgt % | Hvy % |
| --- | --- | --- | --- |
| 0 | 38.0 | 67.4 | 32.6 |
| 2.5 | 50.1 | 73.9 | 26.1 |
| 5 | 73.3 | 86.2 | 13.8 |
| 7.5 | 86.5 | 86.3 | 13.7 |
| 10 | 95.3 | 87.7 | 12.3 |
| 12.5 | 95.1 | 88.8 | 11.2 |

Figure 4:
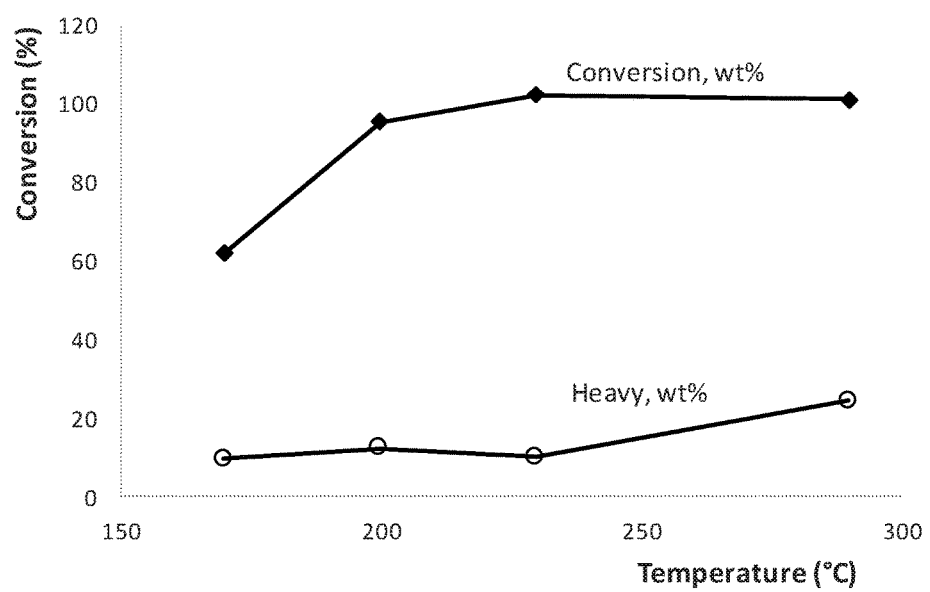
FIG. 4 graphically illustrates variation in biomass conversion with reaction temperature for a process as described herein.

FIG. 4 and Table 4 illustrate the variation in conversion and product selectivity for a corn stover biomass feed processed with 10 g KOH added to the reaction mixture and processed at a variety of reaction temperatures.

TABLE 4

| Temp | Conv % | Lgt % | Hvy % |
| --- | --- | --- | --- |
| 170° C. | 61.9 | 90.4 | 9.6 |
| 200° C. | 95.3 | 87.7 | 12.3 |
| 230° C. | 102.0 | 89.8 | 10.2 |
| 290° C. | 100.8 | 75.8 | 24.2 |

Figure 5:
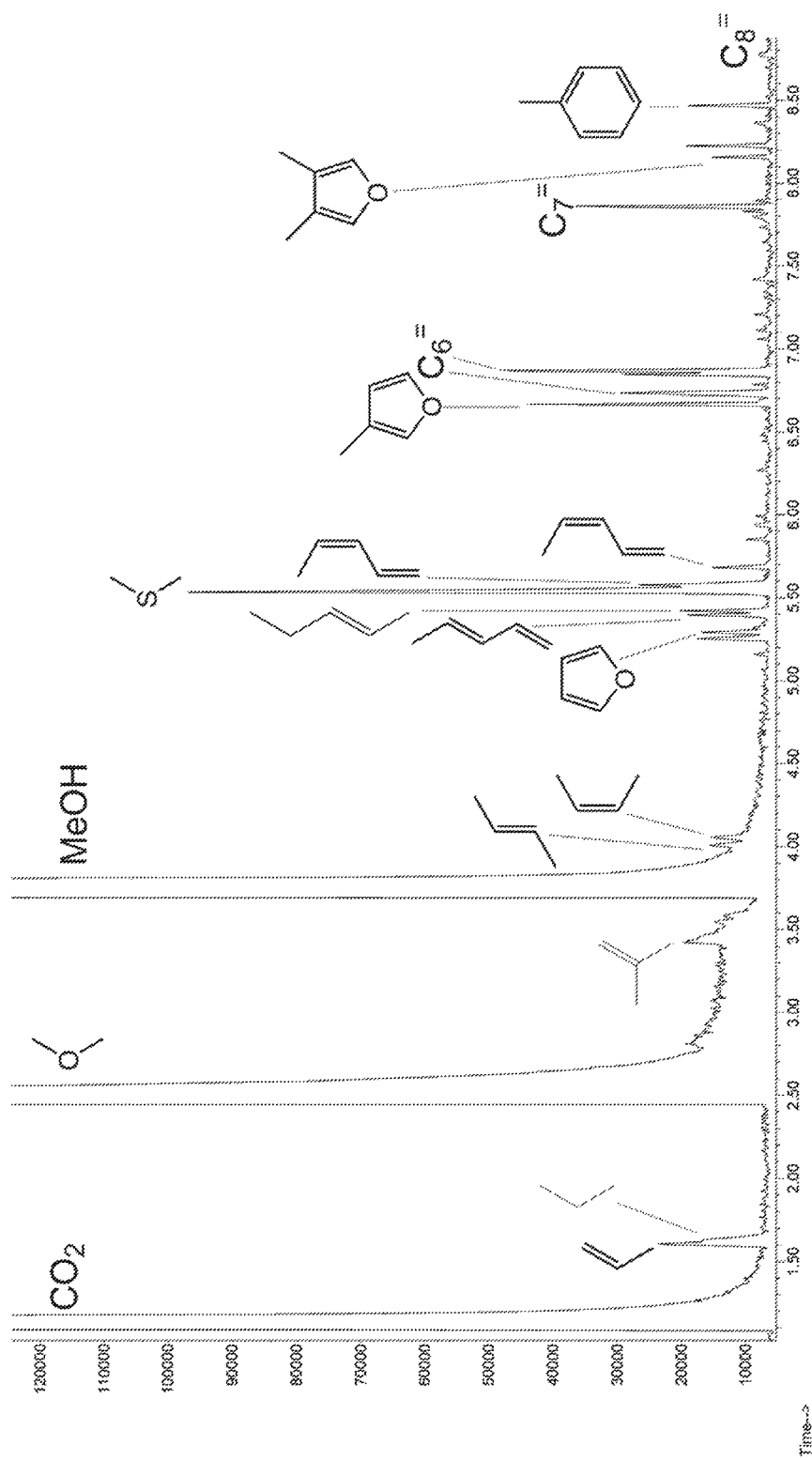
FIG. 5 presents gas chromatograph/mass spectrometer (GC/MS) results for gas and vapor products obtained from a process as described herein.

The gas and vapor product analysis of a typical conversion process as determined by GC/MS is illustrated in FIG. 5. As shown, large numbers of light alkenes were found, indicating C—C bond cleavage of the reaction process. A large amount of $CO_2$ was found, indicating the decarboxylation reaction. The MeOH peak was from the methanol solvent, which also forms dimethyl ether (DME) under the catalytic reaction conditions.

Figure 6:
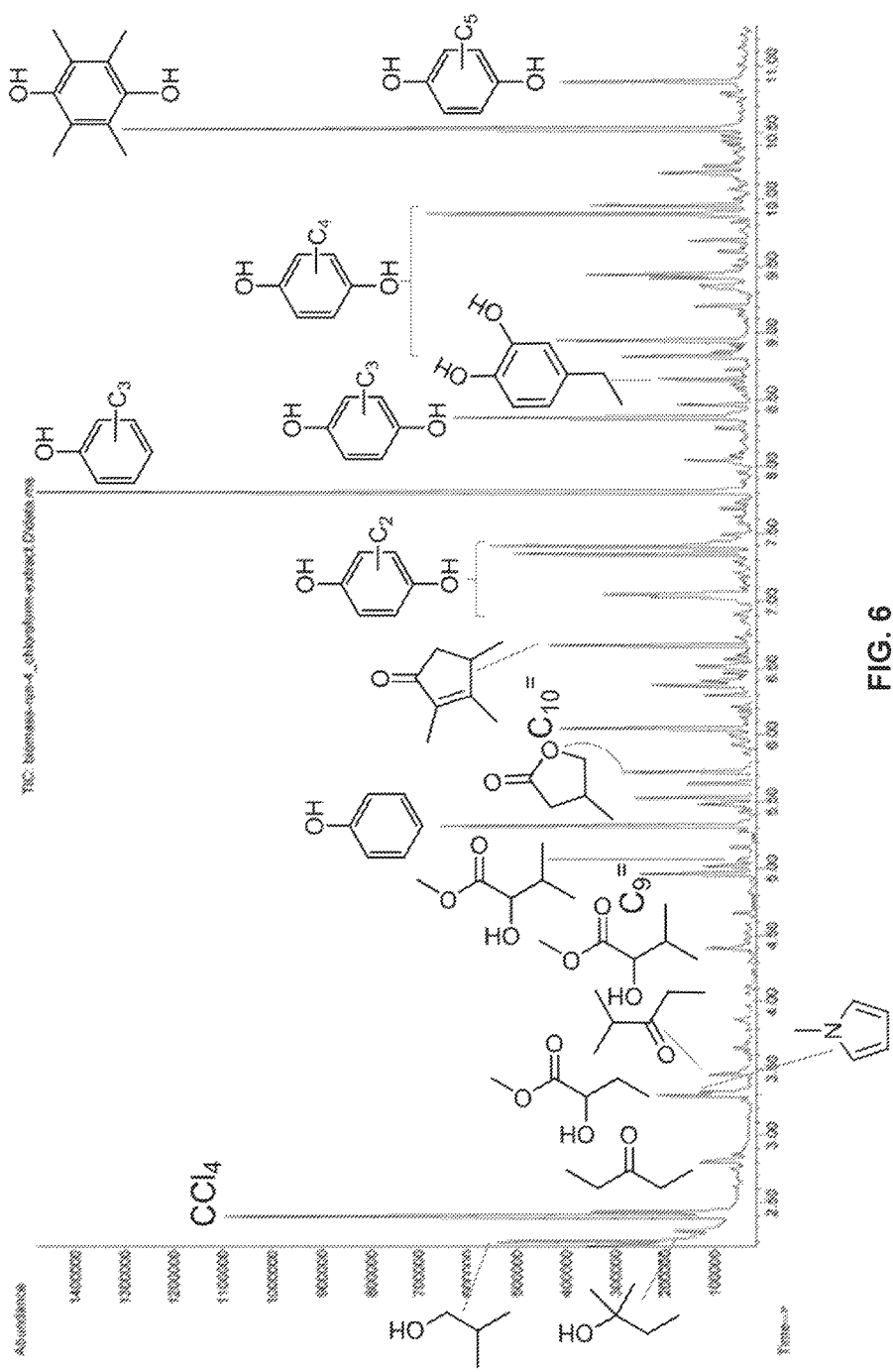
FIG. 6 presents the GC/MS results for light liquid products (liquid at ambient temperature) obtained from a process as described herein.

A significant portion of the liquid products were dissolved in aqueous solution, therefore a chloroform extraction was performed to recover organics in a separatory funnel. These products are identified in FIG. 6 and were identified by GC/MS as esters, ketones, alcohols and phenol derivatives. The presence of phenol derivatives in the product is a clear indication of lignin conversion.

Figure 7:
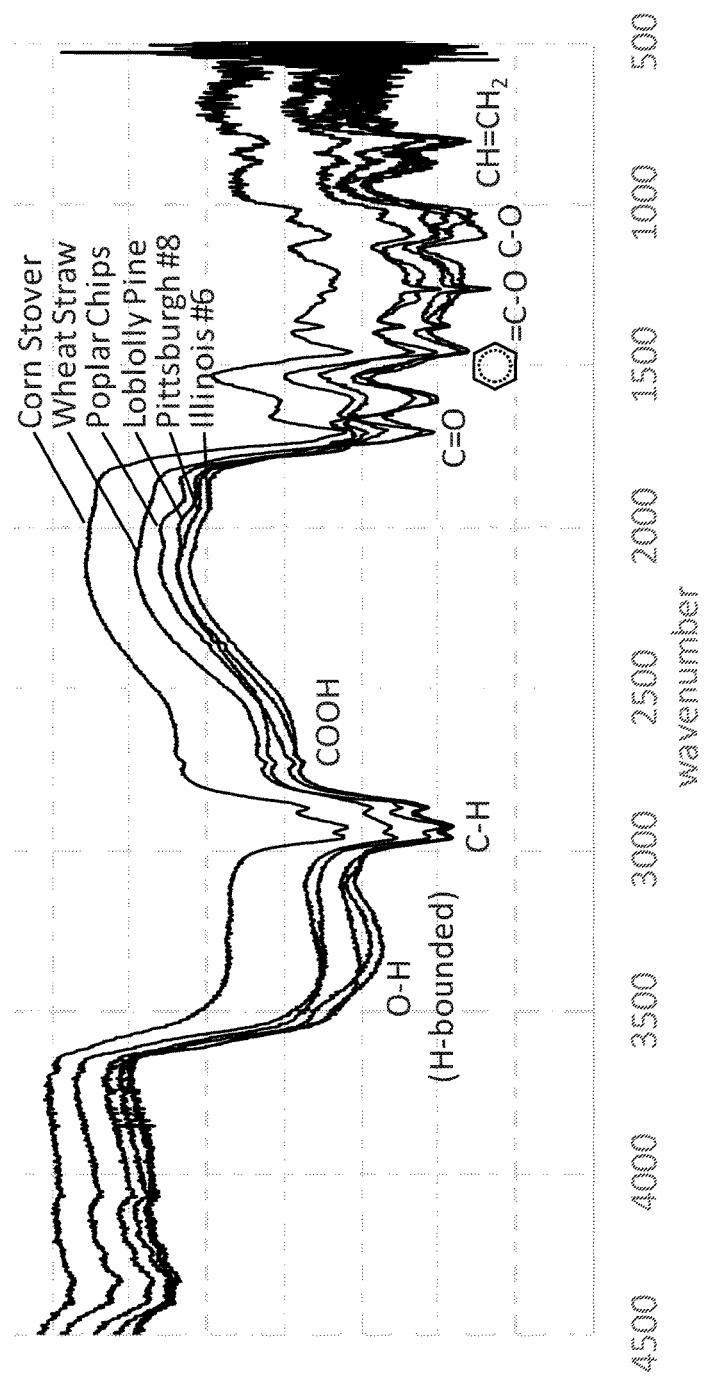
FIG. 7 presents the Fourier-transform infrared spectroscopy (FTIR) results for heavy liquid products (solid at ambient temperature, soluble in tetrahydrofuran (THF)) obtained from a process as described herein and compares the results for several different biomass sources.

The heavy products are identified by FTIR shown in FIG. 7. This portion of the product is organic matter that is THF soluble but has higher molecular weight; therefore, these product components remain solid at ambient temperature.

Heavy products from all biomass feedstocks were similar, and also resembled products from two coal samples: Pittsburgh #8 and Illinois #6. This is consistent with the theory that plant based biomass and coal have a common root. Indeed, coal is a "dead" and "aged" biomass with enormous quantity that can supplement seasonal shortage of the biomass supply. Aromatic, hydrocarbon, alcohol, acid, and unsaturated alkene structures were identified by FTIR, which can be classified as oxygenated hydrocarbons as a whole. Product oxygen can be removed by hydrotreating, which typically results in synthetic crude similar to petroleum.

While certain embodiments of the disclosed subject matter have been described using specific terms, such description is for illustrative purposes only, and it is to be understood that changes and variations may be made without departing from the spirit or scope of the subject matter.

What is claimed is:

1. A method for converting a biomass feedstock to a product comprising liquid hydrocarbons, the method comprising:
    combining a biomass feedstock, a base, and a solvent to form a reaction mixture;
    heating the reaction mixture to a decarboxylation reaction temperature, forming a carbon dioxide byproduct and a product comprising liquid hydrocarbons through a decarboxylation reaction, and reacting the base with the carbon dioxide byproduct to form a carbonate through a carbonate formation reaction;
    wherein the reaction mixture comprises excess base and over the course of the entire decarboxylation reaction and the entire carbonate formation reaction, the reaction mixture is not completely vaporized and the reaction mixture has a pH of greater than 14.

2. The method according to claim 1, wherein the decarboxylation reaction temperature is from about 170° C. to about 300° C.

3. The method according to claim 1, wherein the decarboxylation reaction and the carbonate formation reaction are carried out at a pressure of from about 300 psig to about 6000 psig.

4. The method according to claim 1, wherein the biomass feedstock comprises whole plant biomass.

5. The method according to claim 1, wherein the biomass feedstock comprises waste.

6. The method according to claim 1, wherein the solvent comprises water, recycled biomass product, one or more organic solvents, or a mixture thereof.

7. The method according to claim 6, wherein the one or more organic solvents comprises $C_1$ to $C_8$ organic hydrocarbons, alcohols, ethers, ketones or mixtures thereof.

8. The method according to claim 1, wherein the reaction mixture as formed includes the biomass feedstock and the solvent in an amount such that a molar ratio of carbon of the biomass feedstock to the solvent is from about 1:1 to about 1:10.

9. The method according to claim 1, wherein the base comprises oxides or hydroxides of groups IA or IIA metals in the periodic table, or hydrides of groups IA, IIA, or IIIA metals, or metal-organic compounds containing groups IA, IIA, or IIIA metals.

10. The method according to claim 1, wherein the reaction mixture as formed includes a molar ratio of carbon in the biomass feedstock to a base monovalent equivalent that is from about 5:1 to about 1:2.

11. The method according to claim 1, further comprising processing the carbonate to generate carbon dioxide.

12. The method according to claim 11, the generation of the carbon dioxide comprising acidification of a reaction effluent comprising the carbonate.

13. The method according to claim 12, further comprising electrolysis of the acidified reaction effluent, which regenerates the base, the method further comprising recycling the regenerated base to the reaction mixture.

14. The method according to claim 1, further comprising recovering and recycling the solvent.

15. The method according to claim 1, wherein the method comprises a batch treatment process.

16. The method according to claim 1, wherein the method comprises a continuous treatment process.

17. The method according to claim 1, wherein the reaction mixture comprises the base in a concentration of from 1 M to 4.5 M.

18. The method according to claim 1, wherein complete conversion of the biomass feedstock occurs in about 1 hour or less following heating of the reaction mixture to the decarboxylation reaction temperature.

* * * * *